May 1, 1951  R. B. CROSSET  2,550,785
METHOD AND APPARATUS FOR DEBUTTING BRUSSELS SRROUTS
Filed May 19, 1948  8 Sheets-Sheet 1

INVENTOR
RICHARD B. CROSSET
BY Toulmin & Toulmin
ATTORNEYS

May 1, 1951    R. B. CROSSET    2,550,785
METHOD AND APPARATUS FOR DEBUTTING BRUSSELS SRROUTS
Filed May 19, 1948    8 Sheets-Sheet 2

Fig. 2

INVENTOR
RICHARD B. CROSSET
BY
Toulmin & Toulmin
ATTORNEYS

May 1, 1951 R. B. CROSSET 2,550,785
METHOD AND APPARATUS FOR DEBUTTING BRUSSELS SRROUTS
Filed May 19, 1948 8 Sheets-Sheet 4

Fig.5

INVENTOR
RICHARD B. CROSSET
BY *Toulmin & Toulmin*
ATTORNEYS

May 1, 1951 R. B. CROSSET 2,550,785
METHOD AND APPARATUS FOR DEBUTTING BRUSSELS SRROUTS
Filed May 19, 1948 8 Sheets-Sheet 8

INVENTOR
RICHARD B.CROSSET
BY
Toulmin & Toulmin
ATTORNEYS

Patented May 1, 1951

2,550,785

UNITED STATES PATENT OFFICE 2,550,785

METHOD AND APPARATUS FOR DEBUTTING BRUSSELS SPROUTS

Richard B. Crosset, Cincinnati, Ohio, assignor to The Crosset Company, Cincinnati, Ohio, a partnership Application May 19, 1948, Serial No. 27,957

21 Claims. (Cl. 146—241)

The present invention deals with the preparation of Brussels sprouts to put them in condition for sale to the retail trade and is concerned primarily with apparatus designed to so treat the sprouts as to put them into the condition of a deluxe product.

At the present time, Brussels sprouts are sold in the trade with a large butt attached to the outer leaves of the sprout which are loose and dirty. This means that the housewife or other person preparing the sprouts for cooking must cut off the butt of the sprout, remove the outer leaves, and subject the sprouts to a thorough cleansing. When it is considered that the highest quality sprouts are the fairly small ones, it is evident that the preparation of a batch of sprouts to serve a number of people is a laborious operation. It is believed that the trade in Brussels sprouts is not nearly as extensive as it might be and that this curtailment is directly attributable to the trouble that is required in preparing the sprouts for cooking.

With the foregoing conditions in mind, the present invention has in view as its foremost objective, the provision of apparatus which may be operated to cut off the butts from the sprouts, remove the outer leaves, and thoroughly cleanse the sprouts so that they may be packed in this completely prepared condition. All that is required of the purchaser of sprouts that are so prepared is to remove them from the package in which they are sold and place them in a pot of boiling water to cook them. This invention is founded on the belief that the public acceptance of Brussels sprouts will be greatly increased if they are sold in this condition.

In designing apparatus to fulfill this objective, it becomes necessary to place each sprout in a position where it may be operated upon by a cutting element to sever the butt from the sprout. It happens that Brussels sprouts have a lower specific gravity than water so that they float in water. Moreover, the butt is the heaviest part of the sprout and when a sprout floats in water the butt hangs downwardly. The present invention proposes to take advantage of this characteristic feature in providing apparatus which will present each sprout individually to a cutting element for severing the butt from the sprout.

The invention has as an object the provision of apparatus including a main feed tank that is adapted to contain water at a proper level and on the surface of which water float a layer of Brussels sprouts that are supplied to the tank. A vacuum pickup device is mounted immediately above the layer of floating sprouts to pick up the sprouts individually and present them to the cutting element.

More in detail, the invention has as an object the provision of apparatus including a feed tank of the character indicated together with a vacuum pickup wheel having a plurality of individual openings on each of which a vacuum condition is created to cause a sprout to be drawn from the surface of the water and held on said opening whereby the sprout is positioned with its stalk extending radially outward from the opening. Various detailed features and advantages of the invention are associated with the provision of a vacuum pickup to satisfy this object of the invention.

While it is possible to obtain some degree of uniformity in the sizes of the various Brussels sprouts, there is a discrepancy or variation in size between different sprouts. This means that some sprouts will be wedged into their respective opening in the wheel with a tighter fit than others. An object of the invention is to provide, in apparatus of the character indicated, a suction wheel which includes means for blocking off the vacuum condition from the sprout retaining openings when an angular position thereof is reached and injecting air under pressure into the passages leading to these blocked off openings to forcibly eject the sprouts therefrom. Naturally this blocking off of the vacuum and ejection of the sprouts under air pressure takes place after the butts have been severed from the sprouts.

Another highly important object of the invention is the provision of mechanism for severing the butts from the sprouts as the sprouts are held by the vacuum pickup wheel. While it is believed that various types of cutting devices may be used in satisfying this object, a serrated knife of the endless band type affords the most favorable operation. Detailed features and advantages of the invention are associated with the manner in which this serrated knife is assembled and adjustably mounted in relation to the wheel.

Another object is to remove the severed butts automatically at the moment they are cut from the sprouts and deposits them in a refuse storage bin.

After the butts of the sprouts have been thus severed, the outer leaves become loosened from the sprout while still clinging to the sprout. Under these conditions the outer leaves can then be removed by a washing operation, followed by a final air drying operation which also removes the outer leaves and are susceptible of being removed by sprays or jets of water. Thus, a further object of the invention is the provision, in apparatus of the character aforesaid, of conveyor means to receive the de-butted sprouts and to apply sprays or jets of water from above and below to the sprouts so as to remove the outer leaves and at the same time subject the sprouts to a thorough washing action.

In attaining this objective, the sprouts with the butts severed, are delivered onto an endless conveyor of a foraminous or open-work structure with jets of water being applied to the sprouts from both top and bottom. Other detailed features and advantages of the invention are tied up with the provision of this phase of the apparatus in a practical embodiment.

A further object of the invention is to provide, in an apparatus of the type indicated, means for applying blasts of air to the sprouts after they have been subjected to this washing action. This end is accomplished by passing the endless conveyor aforesaid through a chamber in which the air blasts are applied.

After the sprouts have been subjected to this washing and drying action, a certain amount of refuse in the form of the outer undesirable leaves will have collected on the endless conveyor. A further object of the invention is to provide means for removing this refuse from the conveyor. This means preferably is of a suction type with the flow or velocity of air which is created so controlled as to be just sufficient to lift and remove the refuse without lifting the heavier sprouts from the conveyor. Other detailed features of the invention are tied up with the provision of this refuse removing mechanism.

Still another object of the invention is the provision of apparatus of the type above noted and in which the endless conveyor includes a so-called sorting section. This section presents a space in which the sprouts which have been prepared by the apparatus may be sorted and picked over by operators to remove faulty sprouts. From this sorting section of the endless conveyor the sprouts pass on to a table where they may be weighed or otherwise measured and packed in suitable containers, the latter operations not being a part of the present invention.

Another object of the invention is the provision of a method of preparing Brussels sprouts which includes the steps of severing the butts of the sprouts, removing the outer leaves, and subjecting the sprouts to a thorough washing and drying process.

It will be understood that various other more detailed objects and advantages of the invention are intimately associated with the manner in which the foregoing ideas are carried out in a practical embodiment. These will in part become apparent and in part be hereinafter stated as the description of the invention proceeds.

The invention therefore comprises apparatus designed to prepare Brussels sprouts for the convenience of the ultimate consumer and which includes mechanism for picking up the sprouts individually, presenting them to a cutting device for severing the butts of the sprouts, loosening and removing the outer leaves and at the same time washing the sprouts, and finally drying the sprouts under a blast of air removing the loose and discarded leaves from the product and depositing them in a suitable refuse bin. The invention also embraces the method of treating the sprouts as above outlined.

For a full and more complete understanding of the invention reference may be had to the following description and accompanying drawings wherein.

Referring now to the drawings wherein l:ke reference characters denote corresponding parts, the apparatus of this invention will be described. In setting forth this description, the general assembly will first be outlined after which each of the component assemblies or mechanism will be described in detail.

*General assembly*

Figure 1:
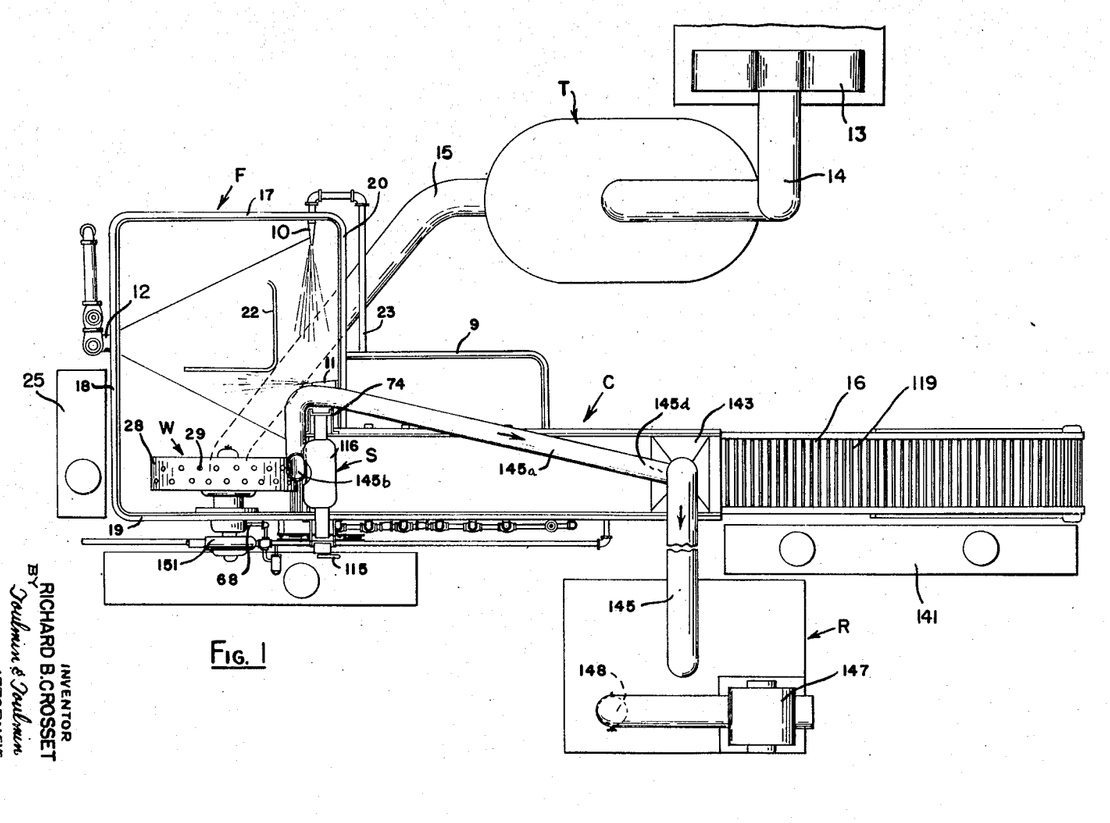
Figure 1 is a top plan view of apparatus designed in accordance with the precepts of this invention.

Referring to Figure 1, a feed tank is therein illustrated and referred to in its entirety by the reference character F. Water is admitted to the tank F by the nozzles 10 and 11 and the level of water in the tank F is controlled by the overflow connection 12. A vacuum pickup wheel W is mounted in a vertical position at one side of the tank in a manner to be later described in detail. The apparatus for creating the vacuum condition in the wheel W is shown as comprising a vacuum pump 13 which is connected to a separation tank T by a conduit 14. The tank T in turn is connected to the wheel W by a conduit 15.

Figure 2:
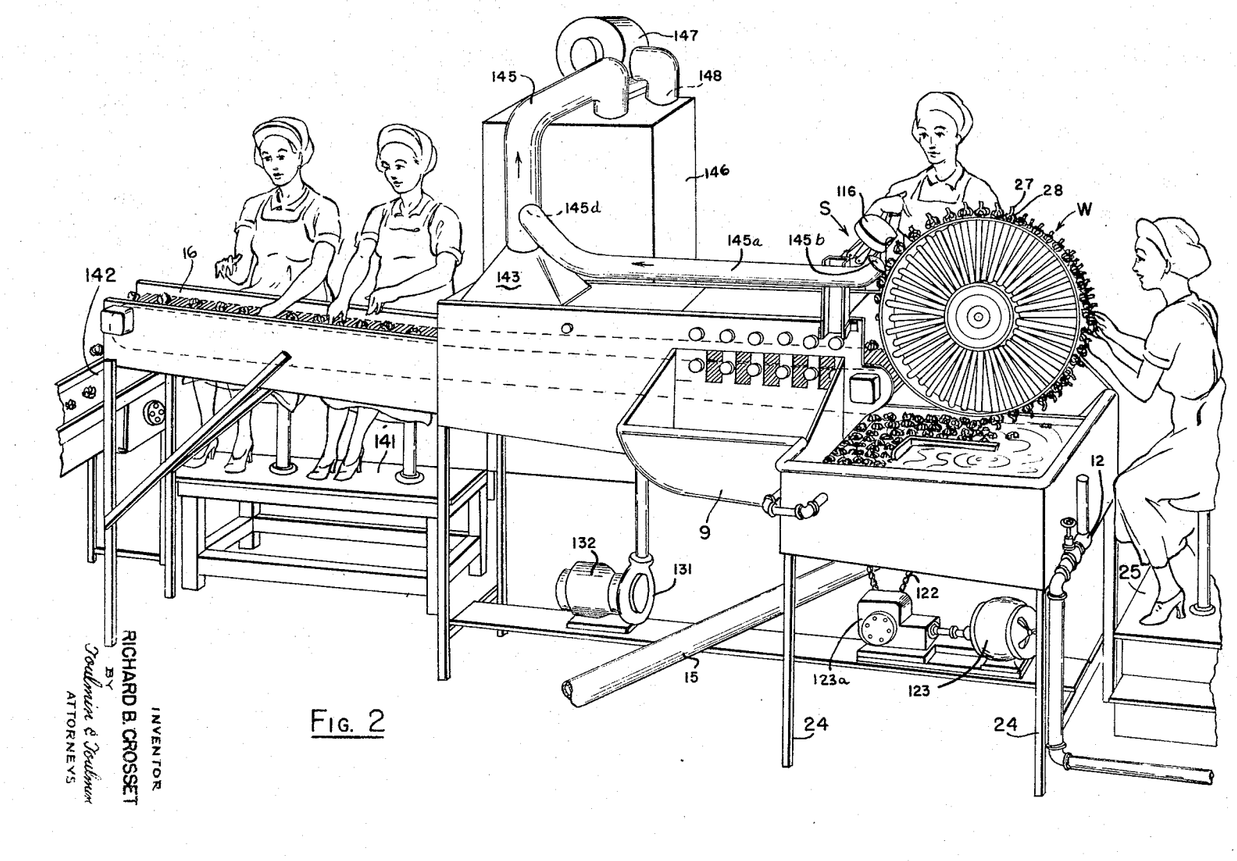
Figure 2 is a perspective view showing the apparatus with the several operators in their respective positions to cause proper functioning of the apparatus.
Figure 5:
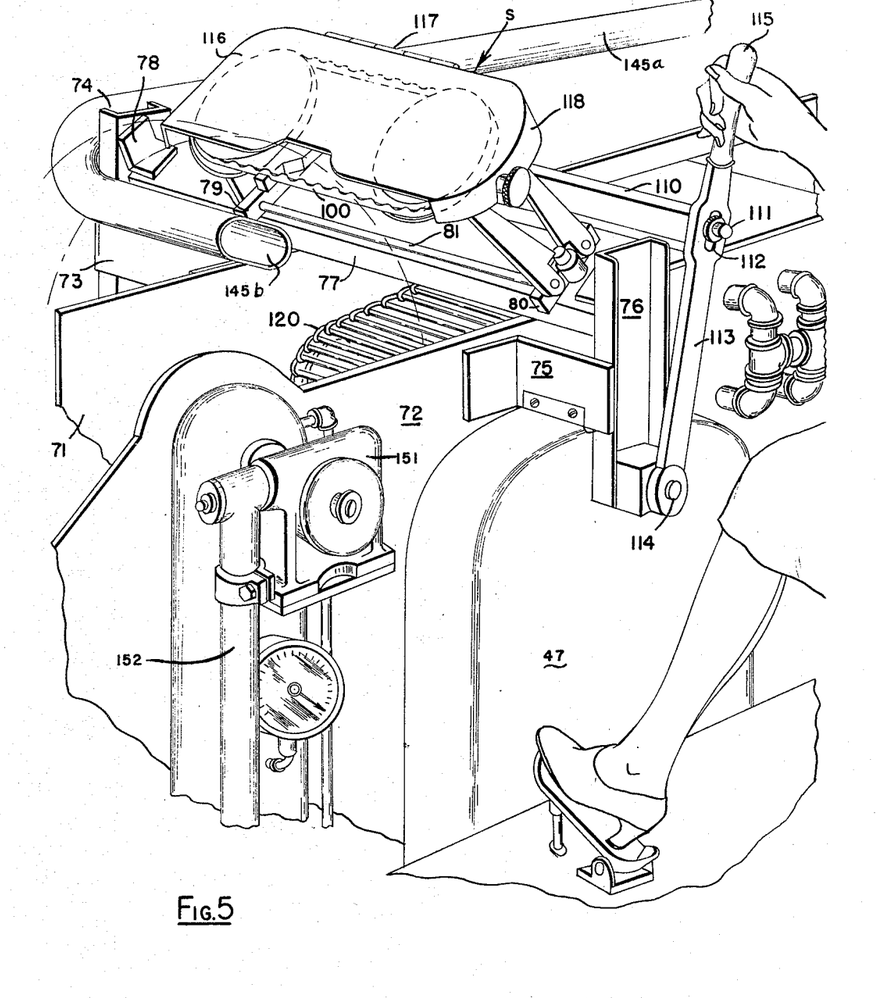
Figure 5 is an enlarged detailed perspective view of the serrated knife and mechanism immediately associated therewith, and particularly showing the butt removing suction pipe.

A serrated knife assembly is referred to in its entirety by the reference character S and is mounted in proper relation to the wheel W, as is clearly illustrated in Figures 2 and 5. An endless conveyor and associated structure is referred to in its entirety by reference character C and has one end properly positioned so as to receive sprouts from the wheel W. A suction pipe 145a connected through a pipe 145 to the refuse suction apparatus at R, picks up the detached butts cut from the sprouts by the serrated knife mechanism S.

As the endless conveyor C of the assembly moves through certain compartments to be later described in detail, the sprouts thereon are subjected to the washing action of jets of water and also to blasts of air. After these operations have taken place, refuse is removed by the apparatus which is indicated generally at R. After passing the point where this apparatus R is effective, the endless conveyor includes an exposed section at 16 which renders the sprouts available thereon for sorting and packaging.

Feed tank

Figure 3:
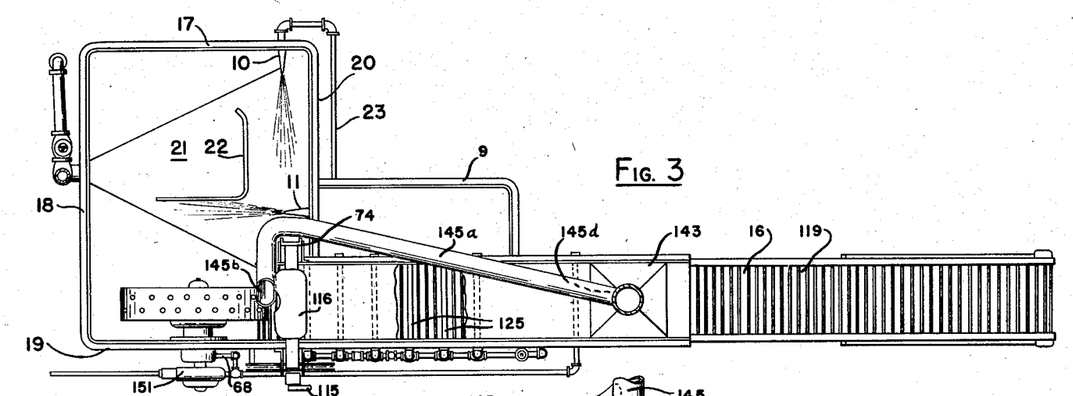
Figure 3 is a top plan view with parts removed and other parts broken away.
Figure 4:
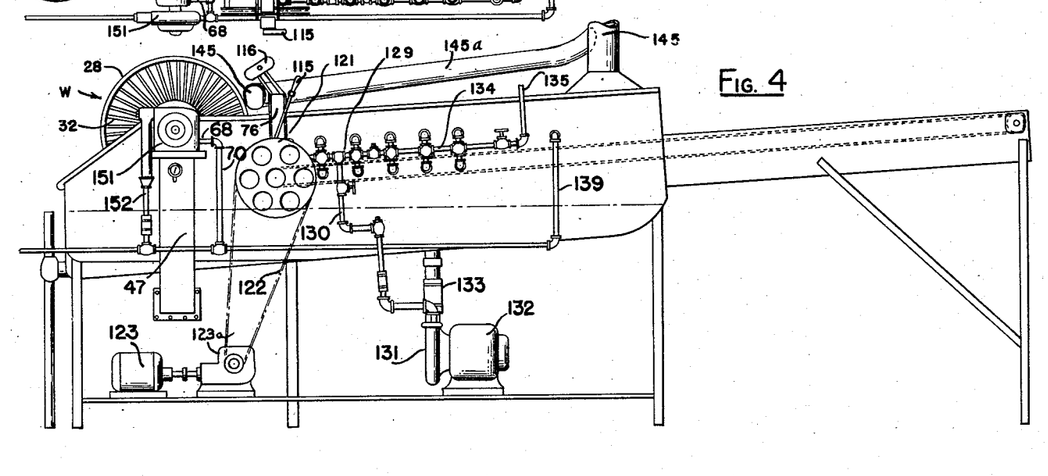
Figure 4 is a view in side elevation of the apparatus with parts of the suction devices removed.

Referring now more particularly to Figures 1, 2, and 3, the feed tank F is shown as being of generally rectangular formation, having rounded corners, and defined by four side walls 17, 18, 19, and 20, together with a bottom 21. A baffle plate 22 of the angle bar formation illustrated upstands vertically from the bottom 21 and is properly related with respect to the nozzles 10 and 11 to cause a circulation of the water in the tank so that the Brussels sprouts which are floating as a layer on the top of the water will be constantly moved towards the wheel W.

The nozzzles 10 and 11 are connected by a conduit 23 to a suitable source of supply of water under pressure. The tank F is supported at a proper height by legs shown at 24. At one end of the tank F there is a platform 25 which is designed to accommodate an operator as will be later described.

The water in the tank F is maintained at the required level by the overflow connection at 12 and, as above explained, is constantly circulated due to the presence of the angular baffle 22 and the jets of water coming from the nozzles 10 and 11 so as to cause the sprouts that float on the surface of the water to be constantly urged in a compact layer beneath the wheel W. Each of these sprouts is identified by the reference character B, Figure 6, and includes a headed sprout portion 26 and a butt 27.

Communicating with the wall 20 of the feed tank F is a drain tank 9 which receives water from the washing chamber of the endless conveyor mechanism as will be later described. This tank is shown clearly in Figure 2.

Vacuum pickup

Figures 6, 7:
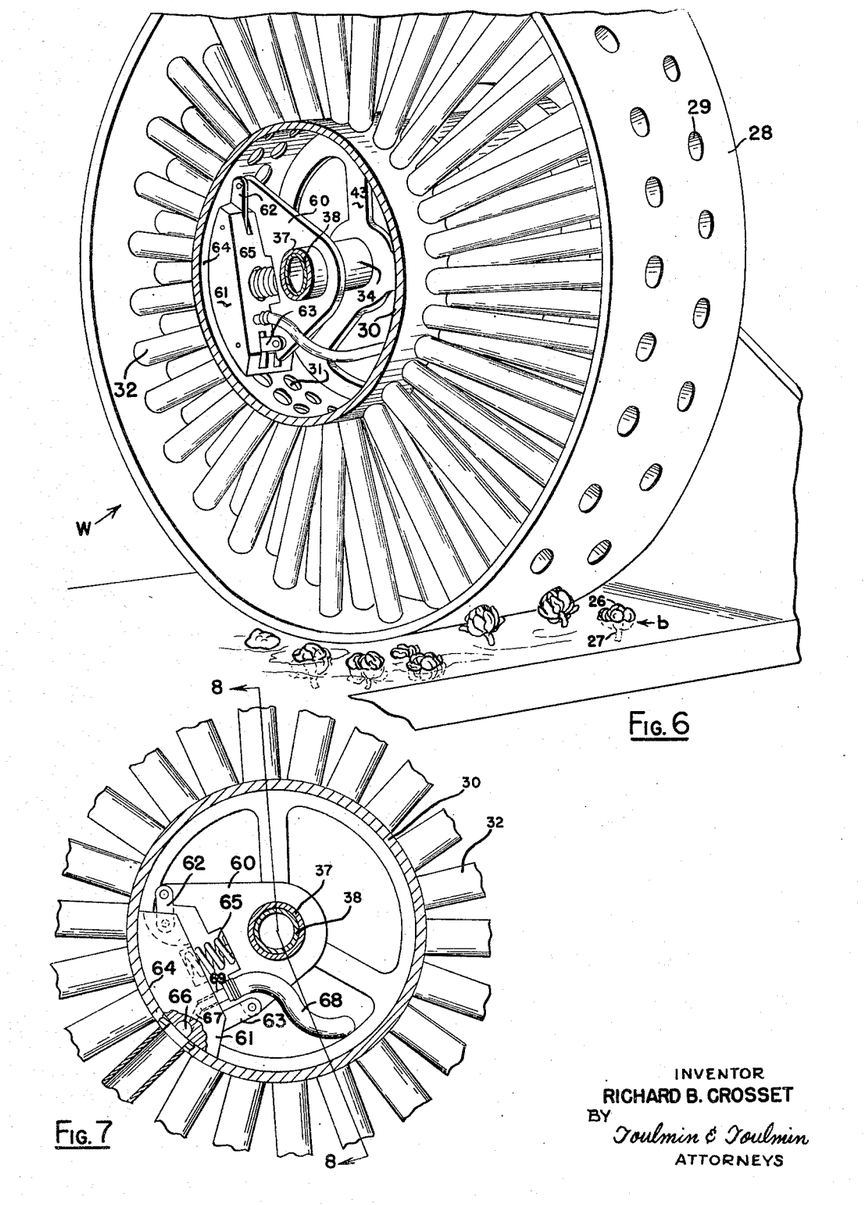
Figure 6 is another enlarged detailed perspective of the suction wheel together with a portion of the feed tank.
Figure 7 is an enlarged detailed view, partly in section and partly in elevation of the hub of the suction wheel and portions of the spokes immediately contiguous thereto.
Figures 8, 9:
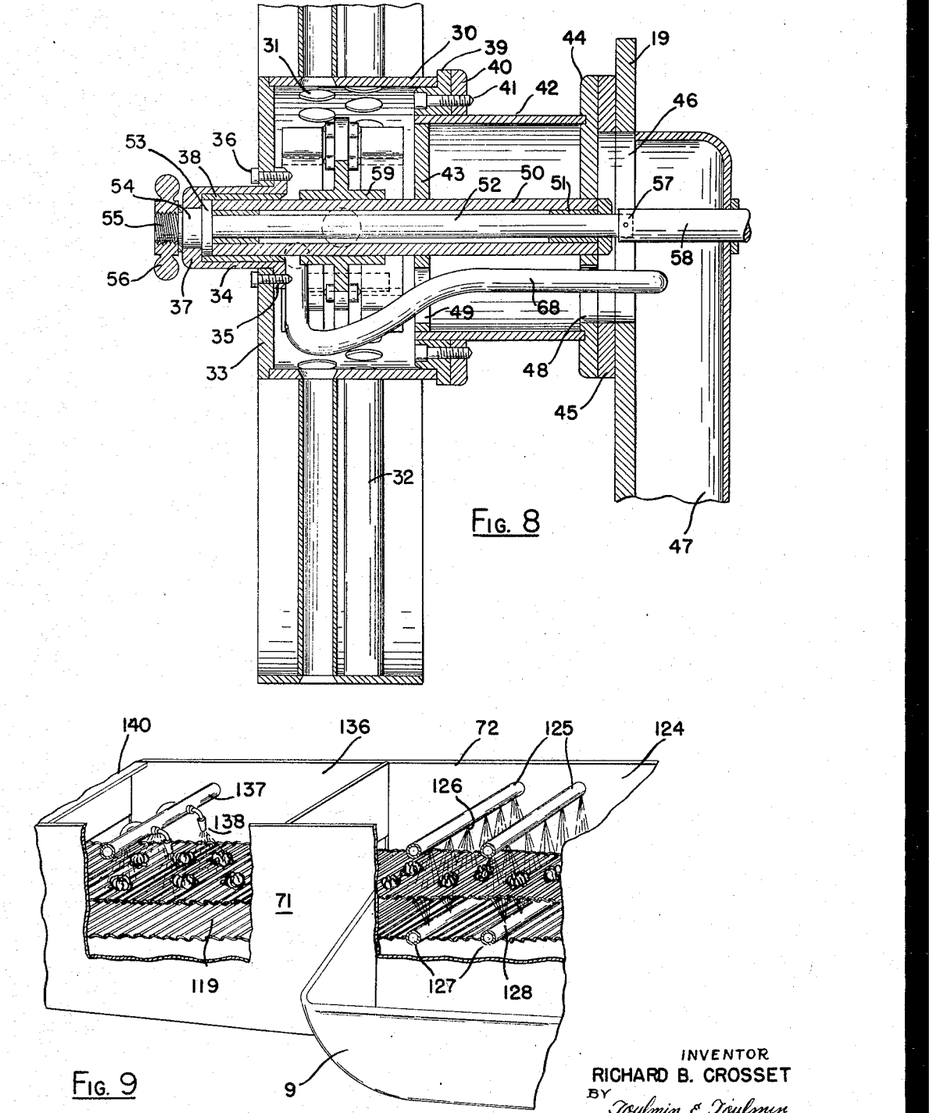
Figure 8 is an enlarged detailed section on the line 8—8 of Figure 7 showing a section through the suction wheel.
Figure 9 is an enlarged detailed view in perspective with parts broken away of the endless conveyor and the washing and drying chambers through which it passes.

Referring more particularly to Figures 6, 7, and 8, the suction wheel W is shown as comprising an outer rim 28 of cylindrical formation and formed with a plurality of openings 29 and an inner hub 30 also of cylindrical formation and formed with openings 31 which correspond to the openings 29. It will be noted that there are two series of the openings 29 with each series arranged in a ring and the openings in one series staggered or interspaced between the openings of the other series. This same condition obtains in the arrangement of the openings 31 in the hub 30. A tubular spoke 32 extends between each opening 29 in the rim 28 and the corresponding opening 31 in the hub. Thus, there are two series of the spokes 32 with the spoke in each series staggered with respect to the spokes in the other series. This staggered arrangement provide for including the maximum number of the tubular spokes in the compact arrangement illustrated.

The hub 30 is closed at its outer or free end by a closure plate 33 having a central opening which receives a thimble 34. This thimble 34 has an inner out-turned flange 35 that is anchored to the plate 33 by screw bolts 36 and an outer in-turned flange 37 which retains a bearing sleeve 38 within the thimble.

The other end of the hub 30 carries a ring 39 which may be secured thereto in any preferred manner and another ring 40 is anchored to the ring 39 by screw bolts 41. A fixed sleeve 42 is positioned within the rings 39 and 40 with the wheel end of the sleeve 42 carrying a plate 43 and its outer end being received in a groove formed in an end plate 44. The latter is secured to a correspondingly shaped plate or washer 45 that is anchored to the wall 19. The wall 19 is formed with an opening at 46 with which communicates the conduit 47, the latter in turn being connected to the conduit 15.

The plate 45 is formed with an opening in alignment with the opening 46 while the end plate 44 is formed with another opening 48 which communicates with the openings in the parts 45 and 19. The plate 43 at the wheel end is also formed with an opening at one side designated 49. Thus, communication between the vacuum pump 13 and the hub 30 is established so that the vacuum condition created by the pump 13 will be effective at the openings 29.

Referring to Figure 8, the plates 43 and 44 are formed with aligned axial openings and a tubular shaft 50 passes through these openings and has its outer end received in the thimble 38. At each end the bore of the tubular shaft 50 carries a spacer element 51 and an inner shaft 52 is received in these spacer elements. The outer end of the shaft 52 is formed with a flange 53 that abuts the tubular shaft 50 and an enlarged part 54 that is enclosed by the flange 37 of the thimble 34. The end of the shaft 52 is threaded as shown at 55 and a wing nut 56 screwed thereonto. The other end of the shaft 52 is pinned as shown at 57 to a rod 58 that extends across the conduit 47. It is evident that the wing nut 56 cooperates with the rod 58 in clamping the fixed part of the hub assembly to the wall 19 of the tank F.

Carried by the tubular shaft 50 is a fixed hub 59 which carries a web 60. A shoe 61 is connected to this web 60 by links 62 and 63 and this shoe has an arcuate surface at 64 which engages the inner surface of the hub over a predetermined angular section. An expansion coil spring 65 is interposed between the web 60 and shoe 61 and serves to urge the shoe against the inner surface of the hub 30 and block off the holes immediately opposite the shoe. Thus, the vacuum condition which is created within the hub 30 is blocked off from those spokes which are immediately opposite the shoe 61.

The purpose of this blocking off is to permit the Brussels sprouts to fall from the openings 29 after the butts of the sprouts have been severed. In some cases these sprouts will be wedged in so tightly that they will not fall away of their own volition. Hence, to insure that they will be ejected, the shoe 61 is formed with a recess 66 that opens onto the arcuate surface 64 and with which communicates a duct shown by broken lines at 67 in Figure 7. A tubular conduit 68 is connected to this duct 67 by a fitting shown at 69. The conduit 68 passes through the openings 49 and 48 and out through a side wall of the conduit 47. It is then connected by a pipe 70 with an appropriate source of supply of air under pressure. Thus, as each opening 31 passes the recess 66 it receives air under pressure which passes through the spoke 32 to the opening 29 at the outer end thereof to eject the sprout which might be held therein.

The serrated knife

The assembly which includes the endless conveyor C embraces side walls 71 and 72 and these side walls are connected to the wall 20 of the tank F. Brackets shown at 73 are connected to the wall 71 and carry a vertically upstanding channel bar 74 that extends up above the top edge of the side wall 71 but which is spaced outwardly therefrom. Likewise, the wall 72 carries a pair of brackets 75 and these brackets in turn carry a vertically extending channel bar 76. The serrated knife assembly S is mounted between these vertical channel bars 74 and 76.

The serrated knife assembly S comprises a base member 77 which, it will be noted, extends between the channel bars 74 and 76 in an inclined position. Angle members 78 may be used to connect each end of the base 77 to the respective channel bar.

Carried by the base member 77 is a pair of blocks 79 and 80 that extend across the upper inclined face of the base 77. These blocks 79 and 80 are connected by tie rods 81. Each of the blocks 79 and 80 has pivotally mounted thereon a pair of links 82 and 83 (see Figure 12), the pivotal connection being shown at 84 and 85, respectively. Each of the links 82 and 83 is cut away adjacent its respective pivotal mounting to provide shoulders, the shoulders being shown at 86 and 87. A plunger 88 is biased by a spring 89 that is carried by the respective block 79 and 80. This plunger 88 normally engages both of the shoulders 86 and 87 and as the links 82 and 83 are swung in either direction one of the shoulders 86 or 87 will force the plunger inwardly. Thus, this spring biased plunger 88 always tends to return the links 82 and 83 to their normal position.

Figure 10:
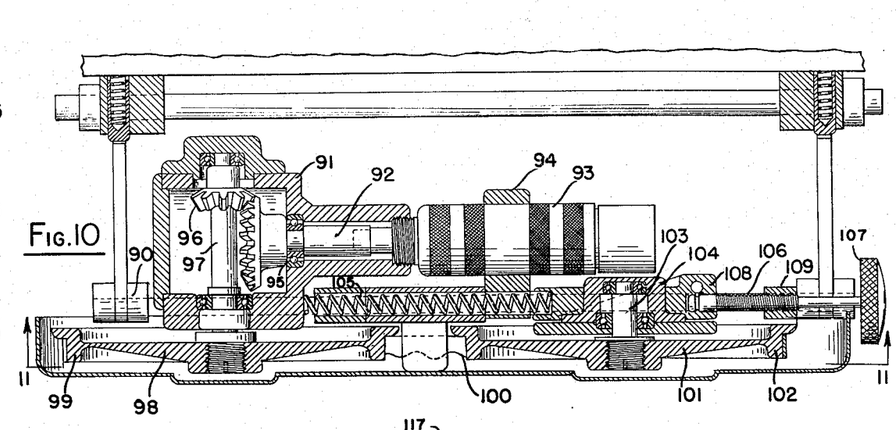
Figure 10 is a longitudinal section on the line 10—10 of Figure 11, through the serrated knife assembly.
Figure 11:
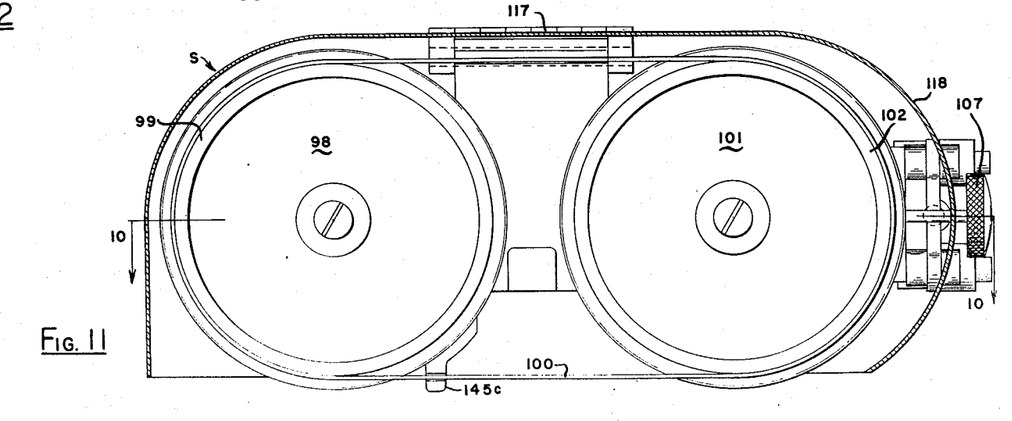
Figure 11 is a view showing the serrated knife assembly on the line 11—11 of Figure 10.

At their outer free ends, the links 82 and 83 are pivotally connected to the elements of the serrated knife frame 90. Carried by the serrated knife frame is a gear box 91 into which leads a shaft 92 which is driven by an air motor 93 that is held in position on the frame by the mounting shown at 94. Within the gear box 91 the shaft 92 drivably carries a bevel gear 95 which meshes with a complemental bevel gear 96 that is drivably mounted on a shaft 97 which is journaled in the gear box 91. Drivably carried by the outer free end of the shaft 97 is a sheave 98 having an outer peripheral rim 99 over which an endless serrated knife band 100 is adapted to pass. This sheave 98 is fixedly mounted in the serrated knife frame.

A second sheave 101 is movably mounted and has a peripheral rim 102 over which the serrate knife band 100 passes. The sheave 101 is carried by a stub shaft 103 which is journaled in a movable hub 104. This hub 104 is urged in a direction away from the gear box 91 by an expansion coil spring 105. A screw stem 106 having an operating knob 107 at its outer free end has its inner end connected to a spring follower 108 against which the spring 105 bears. This spring follower 108 receives the hub 104. The screw stem 106 is also threaded in a bushing 109 carried by the frame 90. Thus, the member 107 may be availed of as a means for adjusting the relative position between the sheaves 98 and 101 and the tension on the saw band 100 caused by the spring 105.

Figure 12:
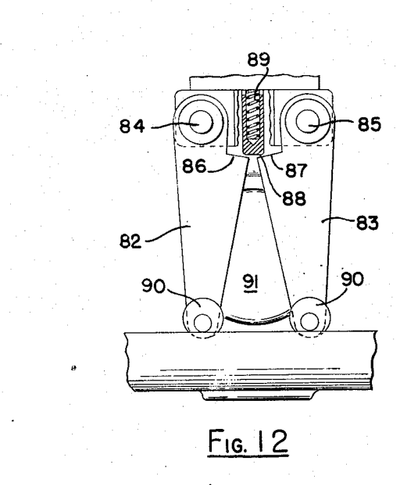
Figure 12 is a view in end elevation of the mounting for the serrated knife assembly.

A cross bar 110 is connected to the frame 90, and at its outer end carries a pin 111. This pin 111 is received in a slot 112 formed in a lever 113 which is pivotally mounted at its lower end on the channel bar 76, the pivotal mounting being shown at 114. The upper end of the lever 113 is formed with a hand grip 115 which may be availed of by the operator to swing the frame 90 so as to bring the teeth of the serrated knife band 100 into engagement with the butts 27 at the proper point for their severance.

The serrated knife assembly S also includes a guard 116 which is pivotally mounted as shown at 117 and which has a peripheral flange 118 that encloses most of the serrated knife band 100. Only that part of the band 100 which actually engages the butts of the sprouts is exposed.

The offal and butts severed from the sprouts B by the serrated knife are received in the opening 145b of the butt removal suction pipe 145a, which opening is preferably located below and just ahead (to the right in Figures 5 and 10) of the stripper and support member 145c of the frame 90. Thus, only the sprouts are deposited on the conveyor 119 for the subsequent washing, drying, and refuse removal operations.

Conveyor

As above explained, the conveyor assembly includes the side walls 71 and 72. An endless conveyor 119 is mounted for operation between these walls in a well-known and conventional manner. This conveyor is of the foraminous construction provided by the cross bars which are linked together in the manner shown at 120 in Figure 5. This conveyor 119 is driven by a sprocket 121, the latter being driven in turn by a roller chain 122 which is in turn driven by the electric motor shown at 123 through a speed reduction unit 123a.

Upon referring more particularly to Figure 9, it will be noted that the side walls 71 and 72 support partitions defining a washing chamber 124 that is immediately adjacent to the tank F. In the washing chamber 124 conduits 125 extend between the side walls 71 and 72 above the top layer of the belt 119. These conduits 125 have downwardly opening ports 126 which provide downwardly directing sprays of water. Other conduits 127 extend between the side walls 71 and 72 and are located between the two layers of the belt 119 or beneath the top layer. These conduits 127 are formed with upwardly opening ports 128 which provide upwardly extending jets of water. Thus, the sprouts b which are carried by the top layer of the belt 119 are subjected to the action of both upwardly and downwardly directed sprays or jets of water. The drain line 9 which, it will be recalled, communicates with the tank F extends beneath the endless conveyor 119 and constitutes the bottom of the washing chamber 124. Thus, spent water is collected in this tank 9 and is recirculated through the feed tank.

In providing for the washing of the sprouts, the invention proposes to not only insure of a thorough removal of the leaves which have been loosened by the severing of the butts from the sprouts, but also a thorough washing by clean water. In this connection, it is to be noted that the cross conduits 125 and 127 which are immediately adjacent to the tank F receive water that is recirculated from the tank while the conduits more remote from the tank receive fresh water.

Thus, a manifold in the form of a pipe 129 is connected to the three pairs of conduits 125 and 127 and also to a pipeline 130 that extends to a pump 131 which is driven by an electric motor 132. A return line 133 leads from the bottom of the tank F to the pump 131. Thus, water is recirculated by the pump 131 from the tank F through the three pairs of conduits 125 and 127 from which it emerges as jets from the spray openings 126 and 128.

A second manifold in the form of a pipe 134 is connected to the three pairs of conduits 125 and 127 that are remote from the tank F. This manifold 134 is connected by a pipe line 135 to an appropriate source of supply of clean water. Thus, after being initially subjected to the action of recirculated water, the sprouts are then washed by clean water.

Immediately adjacent to the washing chamber 124 the walls 71 and 72 define an air chamber 136 in which the washed sprouts are subjected to blasts of air. As shown in Figure 9, a conduit 137 extends between the walls 71 and 72 in the chamber 136 above the belt 119. This conduit 137 carries two pairs of nozzles 138 which open downwardly onto the top layer of the belt. An air line 139 connects this conduit 137 to the source of supply of air under pressure.

Figure 13:
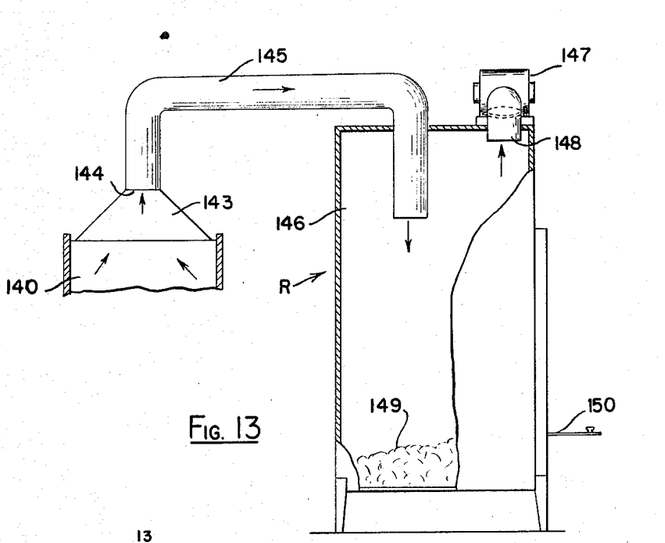
Figure 13 is a side view, partly in section and partly in elevation, of the refuse removing suction mechanism and particularly shows the refuse receiving bin.
Figure 14:
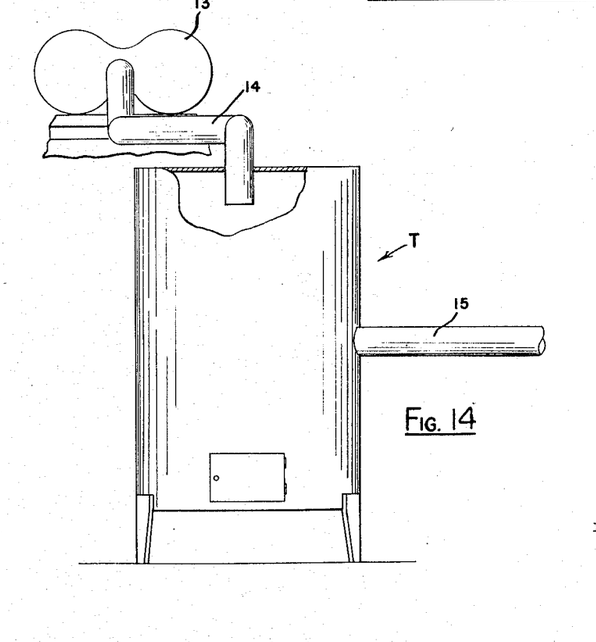
Figure 14 is a side view partly in section of the separation tank included in the apparatus used solely for creating the vacuum condition on the suction wheel.

Adjacent to the air chamber 136 the walls 71 and 72 define a vacuum chamber which is partially shown at 140 in Figure 9 and also represented diagrammatically in Figure 13. It is in this chamber 140 that a vacuum condition is created to remove refuse as will be later described.

After coming from the vacuum chamber 140, the endless conveyor is exposed at 16 to provide the sorting section. A platform 141 is disposed at one side of this sorting section 16 for the accommodation of the operators.

The end of the endless conveyor is positioned over a table 142 as shown in Figure 2 to receive the sprouts that have been prepared and sorted.

*Refuse removing apparatus*

Upon referring to Figures 1 and 13 it will be noted that the suction chamber 140 is covered at the top by a canopy 143 having inclined walls that converge to a central opening at 144. A conduit 145 extends from the canopy 143 to which it is connected at the opening 144 to a refuse receiving bin tank 146. The conduit 145 extends downwardly through an opening in the top of the tank 146.

A blower or suction pump 147 is mounted on top of the tank 146 and a suction conduit 148 extends from the blower down into the tank. Air intake to this suction system enters at the point of entrance and exit 145d of the conveyor. Thus, as the blower 147 is operated, it creates a suction condition in the tank 146 and this suction is in turn transmitted through the conduit 145 to the chamber 140. This suction air velocity is so controlled as to be just sufficiently strong to pick up the loose leaves and refuse but to leave the Brussels sprouts b on the conveyor. The refuse is shown at 149 as collected in the bottom of the tank 146. It may be removed from time to time by opening the gate shown at 150.

*Operation*

It is believed that the operation of the above described apparatus is best understood from a consideration of Figures 2 and 5. An operator will dump Brussels sprouts into the tank F so as to maintain a compact layer on the surface of the water therein. This water is circulated to continuously move the Brussels sprouts about the baffle 22 so that they pass beneath the wheel W, the circulation being caused by nozzles 10 and 11. At the same time, the vacuum pump 13 is operated so as to create the vacuum within the hub 30 which is transmitted through the spokes 32 to the openings 29.

The wheel W is rotated under the influence of the air motor 151 with air being supplied thereto by the pipe line 152 which is connected to the source of supply of air under pressure. As each opening of the wheel W comes down into its lowermost position, the suction will be effective to pick up one of the sprouts b and it will be remembered that the sprout b will be floating in a position with its stalk lower-most. Thus, in most cases, the sprouts will be properly positioned with the stalks extending radially outwardly. However, an operator on the platform 25 will examine the wheel carefully as it rotates and correctly position any sprout which does not have its butt properly disposed. Thus, as the sprouts b travel over the serrated knife 100 each butt is positioned so as to engage the knife band in the most favorable position, for the cutting action. Another operator will avail of the handle 115 of the lever 114 so as to advance or retract the knife assembly and thus insure that the knife 100 properly engages each butt. This knife serves to sever the butts 27 in proper relation to the sprouts 26.

As rotation of the wheel continues and the sprouts b with the butt severed therefrom are continued downwardly, the spokes 32 will pass over the shoe 61 thereby blocking off the vacuum. If the sprouts do not fall from their respective openings 29 with the vacuum blocked off, when the openings 31 pass over the recess 66 air under pressure coming from the conduit 68 will forcibly eject the sprout from the opening 29 at the end of the spoke.

The sprouts with the butts severed and withdrawn by the suction pipe 145a, fall down onto the endless conveyor 119 which is being continuously operated. At first, these sprouts are subjected to the sprays 126 and 128 of recirculated water and then to the sprays of clean water. These sprays will not only wash off the outer leaves which have been loosened due to the removal of the butts but also thoroughly wash the sprouts. They are then subjected to the action of the blasts of air in the air chamber 136. This air will have a drying effect and also remove any loose leaves which still might adhere.

As the endless conveyor moves through the suction chamber 140, the refuse is picked up by the removal apparatus R, and deposited in the refuse bin 146. The endless conveyor now passes to the station 16 at which the operators located on the platform 141 can pick out faulty or undesirable sprouts, leaving only the firm, solid sprouts as the product which is sold to the customer. The sprouts pass off the endless conveyor 119 and onto the table 142 after which they are weighed in desired quantities and packed.

It is evident that the sprouts which have been treated by the foregoing apparatus will be completely prepared and all that is required of the purchaser is to remove the sprouts from the package and cook them in accordance with any recipe.

While a preferred specific embodiment of the invention is hereinbefore set forth it is to be clearly understood that the invention is not to be limited to the exact apparatus, mechanism, and devices illustrated and described because various modifications of these details may be provided in putting the invention into practice within the purview of the appended claims.

What is claimed is:

1. In the preparation of Brussels sprouts, the method comprising the steps of: floating sprouts butt down in water, picking up sprouts individually by their heads from the surface of the water and with their butts extended, moving said sprouts while thus held to a cutting station, severing said butts at said cutting station, releasing said sprouts after the said butts have been severed, and washing the sprouts.

2. The method of preparing Brussels sprouts comprising the steps of: picking up a Brussels sprout from a butt down floating condition from the surface of water, holding said sprout by vacuum by its head and subjecting the butt end to a cutting operation to sever it from the sprout and to initially loosen the outer leaves from said sprout, withdrawing said severed butt to a refuse storage area, and subjecting the remaining sprout to a washing, drying and suction separating operation to remove the excess leaves from the sprout.

3. In the preparation of Brussels sprouts, the method comprising the steps of: supporting a plurality of sprouts individually by their heads with their butts in an extended position and moving the sprouts in one direction, severing the butts from the sprouts while so supported and so moving, releasing said sprouts, and then subjecting the sprouts to a pressure washing operation which removes the outer leaves and subjecting said sprouts to a final air jet blast to remove the remaining outer leaves.

4. The method of preparing Brussels sprouts comprising the step of: placing a series of Brussels sprouts in a tank of water floating on the surface in butt-down condition, picking up said sprouts from said water and holding said sprouts by their head portions with the butt ends projecting in an outward predetermined direction, severing said butts from said sprouts while supporting said sprouts in said manner, removing said severed butts to a refuse area releasing said remaining debutted sprouts and subjecting said released sprouts to a water wash and air drying operation to detach the excess outer leaves from the sprouts, and withdrawing said removed excess leaves to said refuse area while leaving the completely treated sprouts for sorting and packing.

5. In the preparation of Brussels sprouts, the method including the steps of floating sprouts butt down in water, continuously moving the floating sprouts to a pick up station, picking up the sprouts in the pick up station by their heads and supporting them with their butts extended, moving the sprouts while so supported into a cutting station and severing the butts therefrom at said cutting station, and then releasing the de-butted sprouts and continuously moving the de-butted sprouts through a washing, drying, and leaf removing operation to a sorting and packaging station.

6. In the preparation of Brussels sprouts, the method comprising the steps of: picking up sprouts individually by their heads from a source of supply in the form of a floating layer of sprouts, supporting said sprouts individually by their heads with their butts extended in a predetermined position, continuously moving said sprouts in this position to a cutting station, severing the butts from the sprouts at the cutting station, continuously moving said butt removed sprouts through a washing operation, continuously moving said sprouts through a station where they are subjected to the action of jets of air, and then sorting said sprouts to remove defective sprouts.

7. In apparatus for preparing Brussels sprouts, a tank adapted to contain water at a desired level for receiving a plurality of Brussels sprouts to float on said water, movable vacuum pick-up means arranged to move over said tank adjacent the surface of the water for picking said sprouts from the surface of said water individually and with the butts of said sprouts projecting outwardly in a predetermined position, and cutting mechanism adjacent said pick-up means operable to sever said butts from said sprouts while the sprouts are held and moved by said pick-up means.

8. In apparatus for preparing Brussels sprouts, a tank adapted to contain water at a predetermined level for receiving a plurality of Brussels sprouts to float butt down on the surface of said water, a vacuum pick-up wheel having a peripheral rim spaced a predetermined distance above the surface of said water and formed with openings distributed over the width and circumference of said rim, means to create a vacuum condition at said openings to draw Brussels sprouts from the surface of said water and cause them to be held in said openings with their butts extending outwardly from the wheel, means to rotate said wheel, and cutting means extending the width of said rim and spaced therefrom a predetermined amount for severing the butts from said sprouts as they are supported and moved by said wheel.

9. In apparatus for preparing Brussels sprouts, a tank containing water at a predetermined level adapted to receive a plurality of Brussels sprouts to float on the surface of said water, a vacuum pick-up wheel having a peripheral rim spaced above the surface of said water and formed with openings, means to create a vacuum condition at said openings to draw a Brussels sprout from the surface of said water and cause it to be fitted in said opening with the butt extending radially outwardly, means to rotate said wheel while the sprout is so supported, and cutting mechanism adjacent said wheel for severing said butt from the sprout as the wheel carries the sprout past said cutting mechanism.

10. In apparatus for preparing Brussels sprouts, a supply tank containing water maintained at a predetermined fixed level in said tank, a vacuum pick-up wheel rotatably journaled on a horizontal axis having its periphery located in a predetermined position above the surface of the water in said tank, means for circulating the water in said tank so that Brussels sprouts floating butt down on the surface of the water in said tank are moved to pick-up position under said wheel, vacuum means in the periphery of said wheel effective to lift said Brussels sprouts from said water and to hold them on said wheel with the butt ends of said sprouts projecting radially outwardly of said wheel, and a cutting device located adjacent the periphery of said wheel adapted to engage and sever said butts from said sprouts upon rotation of said wheel.

11. In apparatus for preparing Brussels sprouts, a tank containing water at a desired level to receive a plurality of Brussels sprouts to float on the surface of the water in said tank, a vacuum pick-up wheel having a peripheral rim spaced a predetermined distance above the surface of said water and formed with a plurality of openings, means for creating a vacuum condition at each of said openings to cause a sprout to be lifted and held on said opening, means to rotate said wheel, cutting means adjacent the periphery of said wheel to cut the butts from said sprouts as they are held and moved by said wheel, and means to circulate the water in said tank to cause said sprouts to be delivered beneath said wheel in a closely compact condition.

12. In apparatus for preparing Brussels sprouts, a tank containing water at a desired level to receive a plurality of Brussels sprouts to float on the surface of the water in said tank, a vacuum pick-up wheel having a peripheral rim spaced a small distance above the surface of said water and formed with a plurality of openings, means for creating a vacuum condition at each of said openings to cause a sprout to be lifted and held on said opening, means to rotate said wheel, a baffle in said tank and nozzles for delivering jets of water to said tank, said baffle and nozzles causing circulation of the water to move said sprouts beneath said wheel in a closely compact condition, cutting means adjacent the periphery of said wheel spaced from the place the sprouts are picked up by the wheel and operable to sever the butts from said sprouts as they are held and moved by said wheel, and means operable for releasing the de-butted sprouts from the wheel after they have been carried thereby past said cutting means.

13. In apparatus for preparing Brussels sprouts, a tank to contain water at a desired level adapted to receive a plurality of Brussels sprouts floating on said water in said tank, a vacuum pick-up wheel having a peripheral rim spaced a predetermined distance above the surface of said water and formed with a plurality of pick-up openings, means for creating a vacuum condition at each of said openings to cause a sprout to be lifted and supported in said opening with its butt extended substantially radially outwardly from the wheel, means to rotate said wheel, cutting means adjacent the periphery of said wheel operable to sever the butts from said sprouts as said wheel turns, and means to direct the floating sprouts toward the periphery of said wheel including baffle means in said tank defining a restricted channel directly beneath said wheel, water jet means discharging into said tank to cause circulation of water therein and through said channel, and an overflow outlet for controlling the level of water in said tank.

14. In apparatus for preparing Brussels sprouts, a feed tank for receiving a supply of sprouts and presenting a closely compact layer of said sprouts floating on the surface of the water in said tank, said tank including an overflow for controlling the level of water in said tank, an angular baffle upstanding from the bottom of said tank and defining a channel, a pair of angularly arranged nozzles delivering jets of water to said tank to cause circulation of the water therein and through said channel, and a vacuum pick-up wheel over said tank having an apertured periphery located over said channel a predetermined distance over the water therein.

15. In apparatus for preparing Brussels sprouts, a feed tank adapted to contain water at a predetermined level, with a plurality of sprouts floating butt down on the surface thereof, a vacuum pick-up wheel for individually picking up sprouts by their heads from said surface, means for rotating said wheel, cutting mechanism adjacent said wheel for severing the butt from each sprout, an endless conveyor for receiving the de-butted sprouts from said wheel, and means for releasing the sprouts from the wheel after de-butting.

16. In apparatus for preparing Brussels sprouts, a tank containing water at a predetermined level adapted to receive a plurality of Brussels sprouts to float on the surface of said water, a vacuum pick-up wheel having a peripheral rim spaced above the surface of said water and formed with openings, means to create a vacuum condition at said openings to draw a Brussels sprout from the surface of said water and cause it to be fitted in said opening with the butt extending radially outwardly, means to rotate said wheel while the sprout is so supported, cutting mechanism adjacent said wheel for severing said butt from the sprout as the wheel carries the sprout past said cutting mechanism, said cutting mechanism comprising a moving cutting device, and means for driving said cutting device.

17. In apparatus for preparing Brussels sprouts having a supply tank containing water at a predetermined constant level, circulating means in said tank to cause a series of Brussels sprouts floating butt down therein to be brought to a predetermined position in said tank, a rotatable vacuum pick-up wheel located over said position with its periphery maintained at a predetermined height above the surface of the water in said tank, means for driving said vacuum pick-up wheel at a predetermined feeding rate, vacuum pick-up openings in said wheel adapted to withdraw sprouts from said water in said tank and hold them with their butt ends radially extended, a vacuum pump connected through a moisture and refuse separator to said vacuum pick-up openings in said wheel, serrated knife cutting means adjacent the periphery of said wheel, and means for rotating said wheel and said sprouts past said serrated knife cutting means to sever said butts from said sprouts.

18. In apparatus for preparing Brussels sprouts, a tank containing water at a predetermined level adapted to receive a plurality of Brussels sprouts to float on the surface of said water, a vacuum pickup wheel having a peripheral rim spaced above the surface of said water and formed with openings, means to create a vacuum condition at said openings to draw a Brussels sprout from the surface of said water and cause it to be fitted in said opening with the butt of each sprout extending outwardly, means for rotating said wheel, cutting mechanism located adjacent to said wheel to sever the butts from the sprouts as the wheel is rotated and the butts are presented to the cutting mechanism, and mechanism for blocking off the vacuum condition to each opening after it has passed the cutting mechanism.

19. In apparatus for preparing Brussels sprouts having a supply tank containing water at a predetermined constant level, circulating means in said tank to cause a series of Brussels sprouts floating butt down therein to be brought to a predetermined position in said tank, a rotatable vacuum pick-up wheel located over said position with its periphery maintained at a predetermined height above the surface of the water in said tank, means for driving said vacuum pick-up wheel at a predetermined feeding rate, vacuum pick-up openings in said wheel, a vacuum pump connected through a moisture and refuse separator to said vacuum pick-up openings in said wheel, serrated knife cutting means adjacent the periphery of said wheel to sever the butts from the sprouts while rotated to cutting position by said wheel, and suction butt removal means adjacent said cutting device operable to remove the severed butts to a refuse bin at the moment of severance thereof from the sprouts.

20. In apparatus for preparing Brussels sprouts, a supply tank containing water maintained at a predetermined fixed level in said tank, a vacuum pick-up wheel rotatably journaled on a horizontal axis having its periphery located in a predetermined position above the surface of the water in said tank, means for circulating the water in said tank so that Brussels sprouts floating butt down on the surface of the water in said tank are moved to pick-up position under said wheel, vacuum means in the periphery of said wheel effective to lift said Brussels sprouts from said water and to hold them on said wheel with the butt ends of said sprouts projecting radially outwardly of said wheel, a cutting device located adjacent the periphery of said wheel adapted to engage and sever said butts from said sprouts upon rotation of said wheel, suction mechanism for removing said butts as cut from said sprouts, and conveyor means for receiving said sprouts from said wheel at a predetermined point of rotation of said wheel for conducting said severed sprouts through a washing and drying operation to remove the excess leaves loosened by the severing of the butts therefrom.

21. In apparatus for preparing Brussels sprouts having a supply tank containing water at a predetermined constant level, circulating means in said tank to cause a series of Brussels sprouts floating butt down therein to be brought to a predetermined position in said tank, a rotatable vacuum pick-up wheel located over said position with its periphery maintained at a predetermined height above the surface of the water in said tank, means for driving said vacuum pick-up wheel at a predetermined feeding rate, vacuum pick-up openings in said wheel to lift said sprouts from the water and hold them on the periphery of said wheel with the butts radially extended, a vacuum pump connected through a moisture and refuse separator to said vacuum pick-up openings in said wheel, serrated knife cutting means adjacent the periphery of said wheel whereby said serrated knife cutting means severs said butts from said sprouts upon rotation of said wheel, suction butt removal means adjacent said cutting device operable to remove the severed butts to a refuse bin at the moment of severance thereof from the sprouts, a conveyor extending from said wheel and positioned to receive sprouts from said wheel after they have passed said cutting device, and means in said wheel to release said sprouts therefrom after severance of said butts from said sprouts by said cutting device whereby the sprouts are deposited on said conveyor.

RICHARD B. CROSSET.

REFERENCES CITED

The following references are of record in the file of this patent:

UNITED STATES PATENTS

| Number | Name | Date |
|---|---|---|
| 864,238 | Fitzpatrick | Aug. 27, 1907 |
| 1,114,390 | Serres | Oct. 20, 1914 |
| 1,445,997 | Coons | Feb. 20, 1923 |
| 1,448,532 | Harding | Mar. 13, 1923 |
| 1,465,865 | Fue et al. | Aug. 21, 1923 |
| 1,576,051 | Jull | Mar. 9, 1926 |
| 1,747,002 | Hamilton | Feb. 11, 1930 |
| 1,787,746 | Hayes | Jan. 6, 1931 |
| 1,830,199 | Gardner | Nov. 3, 1931 |
| 1,993,899 | Rieske | Mar. 12, 1935 |
| 2,035,118 | Falkiner | Mar. 24, 1936 |
| 2,093,437 | Gwinn | Sept. 21, 1937 |
| 2,152,758 | Cox | Apr. 4, 1939 |
| 2,184,889 | Schneider | Dec. 26, 1939 |

FOREIGN PATENTS

| Number | Country | Date |
|---|---|---|
| 372,740 | Germany | Apr. 3, 1923 |